United States Patent Office 3,180,882
Patented Apr. 27, 1965

3,180,882
PROCESS FOR PRODUCING CYANO-
ALKYLSILANES
Victor B. Jex and John E. McMahon, Buffalo, N.Y.,
assignors to Union Carbide Corporation, a corporation
of New York
No Drawing. Filed Dec. 23, 1955, Ser. No. 555,211
2 Claims. (Cl. 260—448.2)

This invention relates to a process for producing cyanoalkylsilanes. More particularly, the invention relates to a process for producing cyanoalkylsilanes containing at least one hydrolyzable group bonded to the silicon atom thereof.

In copending United States application Serial No. 555,205, filed concurrently herewith, now abandoned, there is disclosed and claimed the process of reacting an olefinic nitrile of the type represented by acrylonitrile, methacrylonitrile, crotononitrile and the like with a silane containing at least one hydrogen atom and at least one hydrolyzable group bonded to the silicon atom thereof to produce a reaction product from which an alpha-cyanoalkylsilane can be recovered. The overall reaction which takes place can be graphically represented by the following equation, which depicts, for the purpose of illustration, the reaction between acrylonitrile and trichlorosilane.

$$H_2C=CH-CN + HSiCl_3 \longrightarrow \underset{\underset{H}{|}\ \underset{SiCl_3}{|}}{H_2C-CH-CN}$$

The present invention is based on our discovery that an olefinic nitrile of the type represented by acrylonitrile, methacrylonitrile, crotononitrile and the like can be caused to react with a silane containing at least one hydrogen atom and at least one hydrolyzable group bonded to the silicon atom thereof in the presence of a catalyst to produce a betacyanoalkylsilane formed by the addition of a silyl group to the beta carbon atom of such nitrile, that is the olefinic carbon atom further removed from the cyano group of the nitrile, and by the addition of a hydrogen atom to the alpha carbon atom of such nitrile, that is the vicinal olefinic carbon atom. Based on our discovery we have further found that any olefinic nitrile can be caused to react with a silane, containing at least one hydrogen atom and at least one hydrolyzable group bonded to the silicon atom thereof, in the presence of a catalyst to produce a cyanoalkylsilane by the addition of a silyl group to the olefinic carbon atom further removed (*) from the cyano group of the nitrile

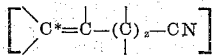

and by the addition of a hydrogen atom to the olefinic carbon atom closer to the cyano group of the nitrile. The overall reaction which takes place can be graphically represented by the following equations which depict, for the purpose of illustration, the reaction between acrylonitrile and trichlorosilane and the reaction between allyl cyanide and triethoxysilane:

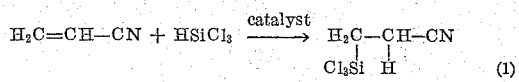  (1)

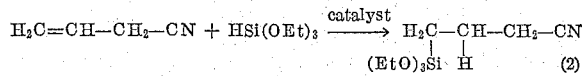  (2)

Our process can be carried out by forming a mixture of an olefinic nitrile, a silane containing at least one hydrogen atom and at least one hydrolyzable group bonded to the silicon atom thereof and a small or catalytic amount of a heterocyclic amine as catalyst for the reaction and heating the mixture to a temperature sufficiently elevated to cause the starting materials to react. There results or is produced a cyanoalkylsilane by the addition of a silyl group to the olefinic carbon atom of the nitrile further removed from the cyano group and by the addition of a hydrogen atom to the olefinic carbon atom of the nitrile closer to the cyano group.

The silane starting materials containing at least one hydrogen atom and at least one hydrolyzable group bonded to the silicon atom thereof, which we can employ in the process can be graphically represented by the following general formula:

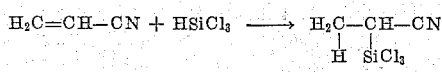

wherein B represents a hydrogen atom or a hydrocarbyl group, preferably a saturated aliphatic hydrocarbyl group as for example, an alkyl group, such as methyl, ethyl, propyl, butyl, pentyl and the like; a cycloalkyl group such as cyclopentyl, cyclohexyl, methylcyclopentyl, ethylcyclohexyl and the like; or an aryl group such as naphthyl, tolyl, methylnaphthyl and the like, X is a hydrolyzable group such as a halogen atom preferably a chlorine atom; or a hydrocarbyloxy group preferably an alkoxy or an aryloxy group such as methoxy, ethoxy, propoxy, phenoxy and the like, and $n$ is a whole number having a value of from 0 to 2. Illustrative of the silane starting materials are trichlorosilane, triethoxysilane, dichlorosilane, diethoxysilane, monochlorosilane, monoethoxysilane, methyldichlorosilane, ethyldiethoxysilane, diethylethoxysilane, dimethylchlorosilane, butylethylchlorosilane, phenyldichlorosilane, phenylethylethoxysilane, dipropylphenoxysilane and the like.

The olefinic nitrile starting materials we can employ are the acyclic aliphatic mono-olefinic nitriles which contain from three to ten carbon atoms to the molecule. Illustrative of such olefinic nitriles are acrylonitrile, methacrylonitrile, allyl cyanide, 1-cyano-3-butene, 1-cyano-4-pentene, 1-cyano-1-hexene and the like. Our preferred olefinic nitrile starting materials are those compounds in which the unsaturated grouping

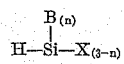

is directly bonded through one of the carbon atoms thereof to the carbon atom of the cyano group. Such olefinic nitriles are commonly known as the vinyl-type cyanides and can be represented graphically by the general formula:

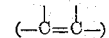

wherein R can be a hydrogen atom or an alkyl group as, for example, methyl, ethyl, propyl, butyl and the like and A is either a hydrogen atom or a methyl group. Illustrative of such vinyl-type cyanides are acrylonitrile, methacrylonitrile, crotononitrile and the like.

The heterocyclic amine catalysts which we employ in our process direct the addition of the silyl group of our starting silanes to the olefinic carbon atom of our starting nitrile further removed from the cyano group thereof and the addition of a hydrogen atom of the starting silane to the vicinal olefinic carbon atom. They are those six-membered heterocyclic amines whose rings contain only carbon and nitrogen or only carbon, nitrogen and sulfur atoms therein and which atoms may contain hydrogen, alkyl or aryl substituents. Illustrative of the alkyl and aryl substituents which can be bonded to the atoms of the heterocyclic ring include methyl, ethyl, propyl, butyl, pentyl, cyclohexyl, phenyl, tolyl and the like. Typical heterocyclic amine catalysts are: 4-ethyl pyridine, gamma-picoline, thiodiphenyl-amine, the polyalkyl pyridines and the like.

We have found that the amount of the catalyst employed in our process is not narrowly critical. Thus amounts of the heterocyclic amines of from as little as about 0.2 part to as much as about 10 parts by weight per 100 parts of the total weight of the starting materials can be favorably employed. We preferably employ the heterocyclic amines in an amount of from about 0.3 part to about 3 parts by weight per 100 parts of the total weight of the nitrile and silane starting materials. Amounts of the heterocyclic amines, in smaller or greater quantities than the favorable range can also be employed. However, no commensurate advantage is obtained thereby.

The olefinic nitrile and silane starting materials can be employed in our process in amounts which can vary from about one-half to 2 moles of the nitrile per mole of the silane. Preferably, the reactants are employed in equimolar amounts. Amounts of either of the starting materials in excess of the ratios set forth above can also be employed; however, no commensurate advantage is obtained thereby.

To facilitate observation and at the same time to favor closer control of the reaction conditions, most of our experimental work was carried out in pressure vessels or bombs, with agitation being provided if desired by continuous shaking. Similar results can be obtained with flowing reactants in apparatus of known design permitting the maintenance of a closed system. In the reactions with which our invention is concerned, it is desirable to maintain sufficiently high concentrations of the reactants (as measured for example in moles per liter of reaction space) to promote effective contact between the molecules to be reacted. When one of the reactants is a gas, or a liquid readily volatile at the reaction temperature, and the reaction mixture is permitted to expand freely on heating, the concentration of that reactant will fall to a low value thus considerably slowing the reaction rate. If however, the reactants are charged to a closed vessel which is sealed before heating, the initial concentration of any reactant falls off through its consumption by the reaction. If reactant is a gas, it may be desirable to charge the reaction vessel to a considerable pressure to secure an adequate concentration and reaction rate, and also to supply enough of the reactant to produce an acceptable quantity of the product.

The temperatures which can be employed in carrying out our process are not narrowly critical and can vary over a wide range. For example, temperatures as low as 40° C. and as high as 350° C. can be advantageously employed. When conducting the process of the invention in a closed vessel a temperature in the range from about 125° C. to about 250° C. is preferred. Under such conditions, a reaction period of from about two to about five hours is suitable. Temperatures of from about 175° C to about 300° C. are preferred when conducting the process in apparatus which provides for the flow of the reactants and products while maintaining the conditions of a closed system. In such systems, where the pressure may range from atmospheric up to 4000 pounds per square inch and higher, the time required for the reaction to take place can be as short as 0.005 minute.

In carrying out the process of our invention the product initially obtained comprises a mixture of compounds including the main cyanoalkylsilane reaction product as well as some unreacted nitrile and unreacted silane starting compounds. The desired addition product, formed by the addition of a silyl group to the olefinic carbon atom of the nitrile further removed from the cyano group and by the addition of a hydrogen atom to the olefinic carbon atom closer to the cyano group, which contains at least one hydrolyzable group bonded to the silicon atom thereof, as for example beta-cyanoethyltrichlorosilane, can be recovered from the initially obtained reaction product by a distillation procedure which is preferably conducted under reduced pressure.

The mechanism of our overall reaction whereby products are produced by the addition of a silyl group to the olefinic carbon atom of the starting nitrile further removed from the cyano group and by the addition of a hydrogen atom of the olefinic carbon atom of the starting nitrile closer to the cyano group with the apparent suppression of other addition or reaction products is not known with certainty or fully understood. It is known that upon heating our reactants in the absence of a heterocyclic amine as catalyst other reactions take place such as: the formation of both silicon- and non-silicon-containing free radicals and complexes, the homopolymerization of the starting nitrile, and even the disproportionation of the starting silane has been observed. In addition, it is known that in the absence of a heterocyclic amine as catalyst, our preferred starting materials can react to produce a product from which an alpha-cyanoalkylsilane, formed by the addition of a silyl group to the olefinic carbon closer to the cyano group and by the addition of a hydrogen atom to the vicinal olefinic carbon, can be recovered with no beta addition products being formed. One possible explanation for the course which our reaction follows when a silane and an olefinic nitrile react in the instance where the nitrile is a vinyl-type cyanide is that the addition of the silyl group to the olefinic carbon atom more removed from the cyano group of the nitrile occurs through an ionic mechanism while the addition of such silyl group to the olefinic carbon atom closer to the cyano group of the nitrile occurs through a free radical mechanism. If such is the case, then the activation energy required for the reaction, between our starting nitriles and silanes, to proceed by a free radical mechanism is considerably less than that required to cause the reaction to proceed by an ionic mechanism and consequently the reaction between an olefinic nitrile and a silane, as for example acrylonitrile and trichlorosilane will produce the alpha-addition product namely, alpha-cyanoethyltrichlorosilane. On the other hand, our heterocyclic amine catalyst apparently have the effect of markedly decreasing the activation energy required for the reaction to proceed by an ionic mechanism and therefore when employed in such reactions, as for example in the above acrylonitrile-trichlorosilane reaction, result in the production of beta-cyanoethyltrichlorosilane.

When the olefinic nitrile is of the type represented by allyl cyanide, that is where the unsaturated grouping

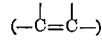

is removed by one or more carbon atoms from the cyano group, our catalyst also functions in promoting the reaction thereof with our silane starting materials to produce addition products by the addition of a silyl group to the olefinic carbon atom more removed from the cyano group, and by the addition of a hydrogen atom to the olefinic carbon closer to the cyano group. By way of illustration, gamma-cyanopropyltrichlorosilane is prepared by reacting allyl cyanide with trichlorosilane in the presence of a heterocyclic amine catalyst in accordance with the subject process.

Bis(cyanoalkyl)silanes are produced in the practice of the process of our invention when our starting nitriles are reacted with silanes containing at least two hydrogen atoms bonded to the silicon atom thereof. In such instances the nitrile starting material is preferably employed in an amount of at least twice the number of moles of the starting silane. The products of the reaction include, in addition to the desired bis compound, the cyanoalkylhydrogensilane. By way of illustration, when two moles of acrylonitrile are reacted with one mole of dichlorosilane in the presence of a heterocyclic amine there is obtained, bis(beta-cyanoethyl)dichlorosilane and beta-cyanoethylhydrogendichlorosilane. Following such procedures, the tris compounds can also be obtained if a silane containing at least three hydrogen atoms bonded to the silicon atom thereof is employed as the starting material.

The cyanoalkylsilanes prepared by the process of our invention are disclosed and claimed as new compositions of matter in copending United States application Serial Nos. 555,202 and 555,203, filed concurrently herewith, both abandoned. Such cyanoalkylsilanes, especially the cyanoalkylsilanes in which the silyl group is bonded to the carbon atom of the nitrile further removed from the cyano group thereof, have found particular use as starting materials in the preparation of omega-aminoalkylsilane sizes for fibrous glass materials.

The following examples are illustrative of the present invention:

Example I

To a 300 cc. stainless steel pressure vessel were added 0.15 mole (7.9 g.) of acrylonitrile, 0.15 mole (20.3 g.) of trichlorosilane and 0.56 g. (2 percent by weight) of 4-ethyl pyridine. The vessel was sealed and heated to a temperature of 200° C. for a period of 2 hours. After heating, the vessel was cooled to room temperautre and the contents thereof added to a flask connected to a distillation column. The contents of the flask were heated to its boiling temperature under a reduced pressure and there was obtained 11.46 g. of beta-cyanoethyltrichlorosilane which was identified by infra-red spectrum analysis. The 11.46 g. of beta-cyanoethyltrichlorosilane obtained represented a yield of 40.6 percent based on the total number of moles of the starting material.

Example II

To a 300 cc. stainless steel pressure vessel were added 0.15 mole (7.9 g.) of acrylonitrile, 0.15 mole (20.3 g.) of trichlorosilane and 0.56 g. (2 percent by weight) of gamma-picoline. The vessel was sealed and heated to a temperature of 200° C., for a period of 2 hours. After heating, the vessel was cooled to room temperature and the contents thereof added to a flask connected to a distillation column. The contents of the flask were heated to its boiling temperature under a reduced pressure and there was obtained 8.88 g. of beta-cyanoethyltrichlorosilane which was identified by infra-red spectrum analysis. The 8.88 g. of beta-cyanoethyltrichlorosilane obtained represented a yield of 31.5 percent based on the total number of moles of the starting material.

Example III

To a 300 cc. stainless steel pressure vessel were added 0.15 mole (7.9 g.) of acrylonitrile, 0.15 mole (20.3 g.) of trichlorosilane and 0.56 g. (2 percent by weight) of a polyalkylpyridine (Polyalkylpyridine 1.95 sold by the Reilly Chemical Company). The vessel was sealed and heated to a temperature of 200° C. for a period of two hours. After heating, the vessel was cooled to room temperature and the contents thereof added to a flask connected to a distillation column. The contents of the flask were heated to its boiling temperature under a reduced pressure and there was obtained 6.03 g. of beta-cyanoethyltrichlorosilane which was identified by infrared spectrum analysis. The 6.03 g. of beta-cyanoethyltrichlorosilane obtained represented a yield of 21.4 percent based on the total number of moles of the starting material.

Example IV

To a 300 cc. stainless steel pressure vessel were added 1.33 moles (70.6 g.) of acrylonitrile, 1.33 moles (180.1 g.) of trichlorosilane and 2.5 g. (1.0 percent by weight) of thiodiphenylamine. The vessel was sealed and heated to a temperature of 200° C. for a period of two hours. After heating, the vessel was cooled to room temperature and the contents thereof added to a flask connected to a distillation column. The contents of the flask were heated to its boiling temperature under a reduced pressure and there was obtained 63.2 g. of essentially beta-cyanoethyltrichlorosilane which was identified by infra-red spectrum analysis. The 63.2 g. of beta-cyanoethyltrichlorosilane obtained represented a yield of 25.2 percent based on the total number of moles of the starting material.

What is claimed is:

1. A process for reacting a silane, represented by the formula:

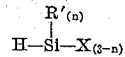

where R' represents a member of the group consisting of hydrogen and a monovalent hydrocarbon group, X represents a member selected from the group consisting of the halogen atoms, the alkoxy groups and the aryloxy groups and $n$ represents a whole number having a value of from 0 to 2, with an acyclic aliphatic monoolefinic nitrile composed only of carbon, hydrogen and nitrogen to produce a cyanoalkylsilane by the addition of a silyl group to the olefinic carbon atom of said mono-olefinic nitrile further removed from the cyano group thereof and by the addition of a hydrogen atom to the olefinic carbon atom of said monoolefinic nitrile closer to the cyano group thereof which comprises forming a mixture of said silane, said mono-olefinic nitrile, and thiodiphenylamine as a catalyst, heating said mixture to a temperature of at least 40° C. to cause said silane and nitrile to react to produce a cyanoalkylsilane by the addition of a silyl group to the olefinic carbon atom further removed from the cyano group of the starting nitrile and by the addition of a hydrogen atom to the olefinic carbon atom closer to the cyano group of the starting nitrile.

2. A process for producing beta-cyanoethyltrichlorosilane which comprises forming a mixture of acrylonitrile, trichlorosilane and thiodiphenylamine, heating said mixture to a temperature of from about 125° C. to about 300° C. to cause said acrylonitrile and trichlorosilane to react to produce beta-cyanoethyltrichlorosilane.

References Cited by the Examiner
UNITED STATES PATENTS 3,099,670  7/63  Prober _____ 260—448.2

TOBIAS E. LEVOW, *Primary Examiner.*

JULIUS FROME, EARL W. HUTCHISON, ALLAN M. BOETTCHER, ROGER L. CAMPBELL,
*Examiners.*